Feb. 24, 1925.  1,527,878
B. KOLBER
AUTOMOBILE
Filed Nov. 16, 1923  2 Sheets-Sheet 2
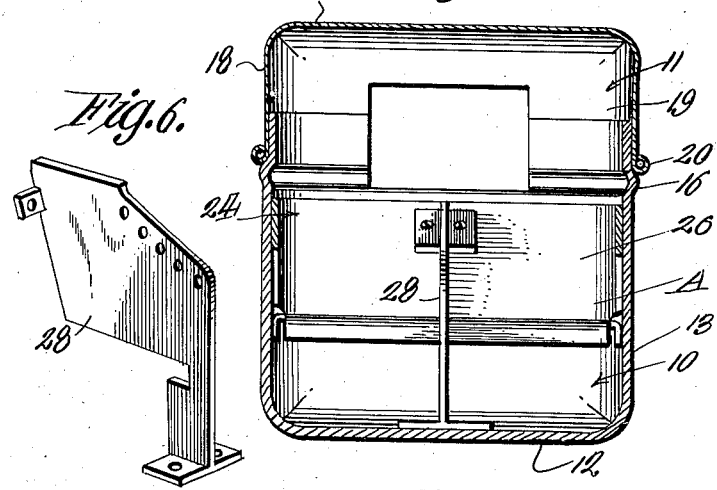
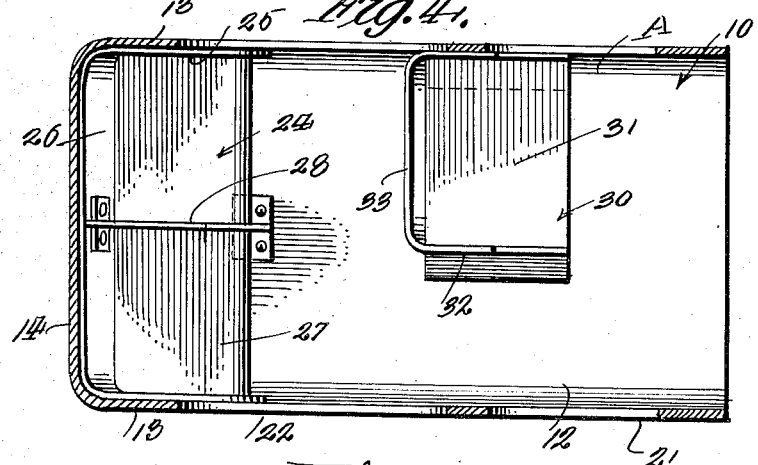
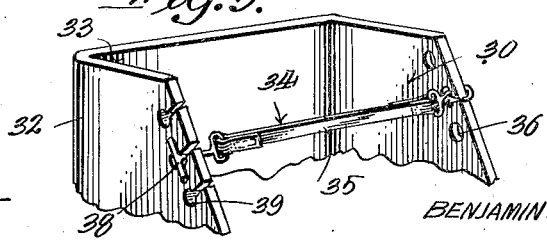
Inventor
BENJAMIN KOLBER Patented Feb. 24, 1925.

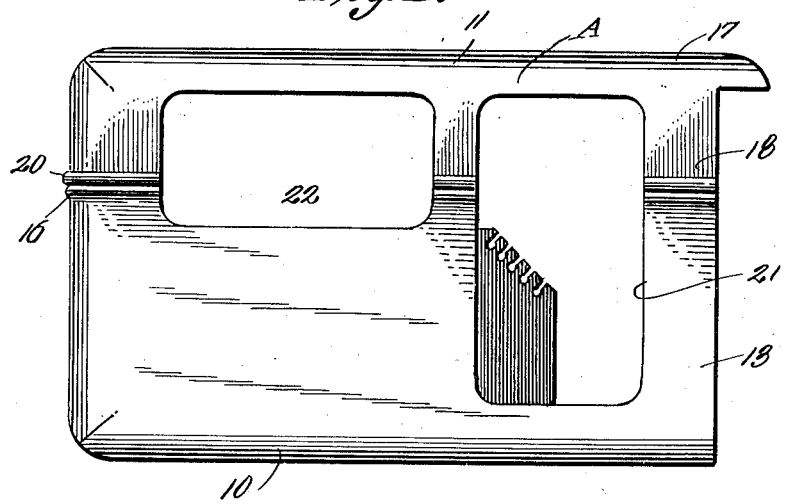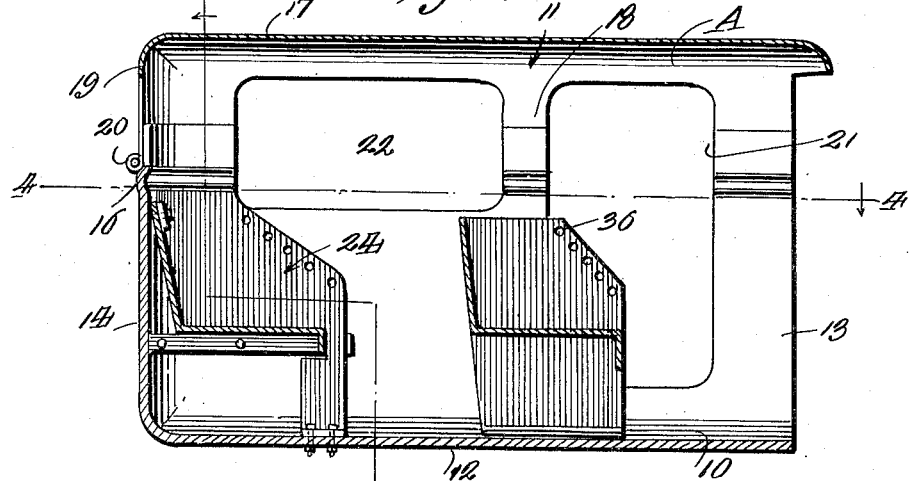

1,527,878

UNITED STATES PATENT OFFICE.

BENJAMIN KOLBER, OF PHILADELPHIA, PENNSYLVANIA.

AUTOMOBILE.

Application filed November 16, 1923. Serial No. 675,228.

*To all whom it may concern:*

Be it known that I, BENJAMIN KOLBER, citizen of the United States, residing at Philadelphia, in the county of Philadelphia and State of Pennsylvania, have invented certain new and useful Improvements in Automobiles, of which the following is a specification.

This invention appertains to automobiles and one of the primary objects of the invention is to provide an improved automobile body constructed from pressed metal stamped into the desired form.

Another prime object of the invention is to provide an automobile body constructed from light metal, such as aluminum, pressed into the desired configuration, the body including a lower section formed of relatively thick metal, so as to resist shock transmitted thereto and a top section formed of relatively thin metal.

A further prime object of the invention is the provision of novel means for bracing the body by the arrangement of the seats therein, the seats being also preferably stamped from sheet metal.

A further prime object of the invention is to provide a novel safety seat for the body having novel means for effectively preventing persons in the seat from being thrown off of the seat, when the machine comes to an abrupt stop.

A still further object of the invention is to provide an improved automobile body of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a side elevation of the improved automobile body.

Figure 2 is a vertical longitudinal section through the same.

Figure 3 is a transverse section through the body taken on the line 3—3 of Figure 2.

Figure 4 is a longitudinal horizontal section through the body taken on the line 4—4 of Figure 2, and Figure 5 is a detail fragmentary perspective view of one of the seats illustrating the novel means for preventing the person occupying the seat from being thrown out of the same, when the automobile comes to an abrupt stop, and Figure 6 is a perspective view of the removable partition seat plate.

Referring to the drawings in detail, wherein similar reference characters designate corresponding parts throughout the several views, the letter A generally indicates the improved automobile body, which is preferably formed of pressed metal stamped into the desired configuration. It is preferred to use aluminum for making the body, in view of the light weight thereof. In the drawings, the body has been shown of the closed type, such as a sedan and the body includes the lower section 10 and the upper or top section 11.

The lower section 10 is formed from relatively thick metal, so as to permit the same to resist all strains and shock, to which the same may be subjected. The lower section 10 includes the lower wall or floor 12, the longitudinally extending side walls 13 and the rear wall 14. It is to be of course understood, that the forward end of the body is to merge into the front part of the automobile with which it is associated, and so as to permit the hood and cowl of the machine to be connected therewith in such a manner as to give a stream line effect. It can be seen that the stamping of the lower section 10 can be readily accomplished, as it is merely necessary to bring up the side and rear walls 13 and 14 from the bottom wall or floor 12. The side walls 13 and the rear wall 14 preferably have their upper ends slightly offset and bent to provide a bead 16, the purpose of which, will be hereinafter more specifically described.

The upper section 11 consists of the top wall or roof 17 and the depending side walls 18 and the rear wall 19. The side walls 18 and the rear wall 19 are in direct alignment with the side walls 13 and the end wall 14 of the lower section 10 and the side walls 18 and end wall 19 of the top section 11 are adapted to receive the side walls 13 and rear wall 14 of the lower section 10 as can be clearly seen by referring to Figures 2 and 3 of the drawings. If so desired, the extreme lower edge of the side and rear walls of the top section can be rolled to provide a bead 20 for engaging the bead 16 formed on the lower section. The upper and lower sections can be secured together in any desired way. By referring to Figures 2 and 3, it can be seen that the top section 11 is formed of relative thinner material than the lower section 10 in view of the fact that the upper section 11 will not have to stand as much shock as the lower section.

The body A is suitably cut to provide door and window openings 21 and 22 respectively, as can be readily seen by referring to the drawing.

It is also preferred to form the frames of the seats from sheet metal and as shown the rear seat 24 extends entirely across the rear end of the body and includes side plates 25 which support the back 26 and the seat bottom 27. The side plates 25 can be rivited or otherwise secured to the side walls 13 of the section 10 of the body A and it is obvious that the seat will effectively strengthen and brace the body. The rear seat 24 can be divided into two or three seat portions.

In the drawing, the rear seat 24 has been shown divided into two portions by a central removable partition plate 28 which is detachably secured respectively to the seat back 26 and the floor 12 of the section 10 and the seat bottom 27.

The front seat 30 includes a seat bottom 31 which is secured to the side plates 32, which extend all the way down to the floor of the body. The side plates 32 and the seat bottom 31 support the back 33 as clearly shown in the drawing.

In order to prevent the passengers of the automobile from being thrown off of the seats, when the car comes to a sudden or abrupt stop, I provide novel retaining means 34, which forms an important part of my invention. This retaining means 34 includes a strap 35 which has one end provided with an eye, which is passed through any one of the openings 36 formed in the side plate of the seat, while the other terminal thereof supports a short retaining bar 38, which is passed through any one of the keyhole slots 39 formed in the opposite side plates of the seat. It is obvious that a plurality of straps can be employed so as to extend substantially from the top of the side plates of the seat to the seat bottom, which will effectively prevent a passenger of the automobile from being jolted off of his seat.

From the foregoing description it can be seen that I have provided an improved automobile body of exceptionally simple and durable character, which can be placed upon the market at a minimum cost.

Changes in details may be made without departing from the spirit or the scope of this invention.

What I claim as new is:

1. An automobile body constructed from pressed metal stamped into the desired configuration comprising a lower integral section including a floor, side and end walls, a top integral section including a roof, and depending side and end walls, the side and end walls of the top section frictionally receiving the side and one end wall of the bottom section, to permit the retaining of the sections together, and means for bracing the lower section.

2. An automobile body constructed from pressed aluminum stamped into the desired configuration embodying a lower section including a floor, side and end walls, the side and end walls having a bead struck out therefrom adjacent to the upper edge thereof, a top section including a roof, depending side and end walls, the depending side and end walls of the top section being adapted to receive the upper ends of the side and one end wall of the lower section, and a rolled bead formed on the lower edge of the end and side walls of the top section for engaging the bead formed on the side and one end wall of the lower section.

In testimony whereof I affix my signature in presence of two witnesses.

BENJAMIN KOLBER.

Witnesses:
HARRY E. DANKELMANN,
WILLIAM C. PETER.